United States Patent [19]

Taniguchi et al.

[11] Patent Number: 5,320,986

[45] Date of Patent: Jun. 14, 1994

[54] GREEN-COLORED INFRARED AND ULTRAVIOLET RADIATION ABSORBING GLASS AND METHOD OF PRODUCING SAME

[75] Inventors: Masakazu Taniguchi; Yasushi Taguchi; Naoki Sunamoto, all of Matsusaka, Japan

[73] Assignee: Central Glass Co., Ltd., Ube, Japan

[21] Appl. No.: 997,464

[22] Filed: Dec. 28, 1992

[30] Foreign Application Priority Data

Dec. 27, 1991 [JP] Japan .................... 3-346312

[51] Int. Cl.$^5$ .................... C03C 3/087
[52] U.S. Cl. .................... 501/70; 65/134
[58] Field of Search .................... 501/69, 70; 65/134, 65/135

[56] References Cited

U.S. PATENT DOCUMENTS

| | | | |
|---|---|---|---|
| 3,830,639 | 8/1974 | Evans et al. | 501/70 |
| 4,713,359 | 12/1987 | Lubelski et al. | 501/63 |
| 4,792,536 | 12/1988 | Pecoraro et al. | 501/70 |
| 5,077,133 | 12/1991 | Cheng | 428/426 |
| 5,214,008 | 5/1993 | Beckwith et al. | 501/69 |

FOREIGN PATENT DOCUMENTS

| | | |
|---|---|---|
| 0297404 | 1/1989 | European Pat. Off. |
| 0469446 | 2/1992 | European Pat. Off. |
| 0488110 | 6/1992 | European Pat. Off. |
| WO91/07356 | 5/1991 | PCT Int'l Appl. |
| WO91/11402 | 8/1991 | PCT Int'l Appl. |

OTHER PUBLICATIONS

H. Scholze: "Glas", 1977, Springer-Verlag, Berlin, 2nd edition, pp. 188-191.
Chem. Abs. vol. 87, No. 6, 1977; Abstract No. 43246y.
Database WPI, Week 7804, Derwent Pub. Ltd., London, GB (1978).
Database WPIL, Week 8631, Derwent Publ., Ltd., London, GB (1986).

Primary Examiner—Anthony Green
Assistant Examiner—A. Wright
Attorney, Agent, or Firm—Keck, Mahin & Cate

[57] ABSTRACT

An infrared and ultraviolet radiation absorbing glass suitable for use in building and vehicle windows, which comprises, on a weight basis, 68-72% of $SiO_2$, 1.6-3.0% of $Al_2O_3$, 8.5-11.0% of CaO, 2.0-4.2% of MgO, 12.0-16.0% of $Na_2O$, 0.5-3.0% of $K_2O$, 0.03-0.30% of $SO_3$, 0.58-0.80% of total iron expressed as $Fe_2O_3$, 0.1-0.7% of $CeO_2$, 0.1-0.4% of $TiO_2$ and 5-350 ppm of MnO. In the glass the ratio of ferrous iron to ferric iron is in the range from 0.50 to 0.70. The glass has a greenish tint and is well balanced in visible light transmittance, infrared radiation absorption and ultraviolet radiation absorption, and a sheet of the glass can be easily tempered by a conventional method.

13 Claims, No Drawings

GREEN-COLORED INFRARED AND ULTRAVIOLET RADIATION ABSORBING GLASS AND METHOD OF PRODUCING SAME

BACKGROUND OF THE INVENTION

This invention relates to an infrared and ultraviolet radiation absorbing glass and a method of producing the glass. The glass has a greenish color and sufficiently high transmittance for visible light and is particularly suitable for use in building and vehicle windows.

For windows of buildings, automobiles and other vehicles there is an increasing demand for sheet glass that is sufficiently transparent to visible light and absorptive of not only infrared rays but also ultraviolet rays.

It is known to render a soda-lime-silica glass absorptive of infrared and ultraviolet rays by incorporating iron in the glass. Ferrous iron expressed as FeO provides the glass with the absorption of infrared radiation, whereas ferric iron expressed as $Fe_2O_3$ provides the glass with the absorption of ultraviolet radiation. In practice $Fe_2O_3$ is used as the source of the entire iron, and an adequate portion of $Fe_2O_3$ is reduced to FeO during the glassmaking process.

Also it is known to incorporate $CeO_2$ and/or $TiO_2$ in a soda-lime-silica glass for the absorption of ultraviolet radiation.

From an industrial point of view, it is desired that an infrared and ultraviolet absorbing glass in the form of sheet glass can be produced without significantly changing the conditions of conventional glass melting and refining operations. Also it is desired that an infrared and ultraviolet absorbing glass sheet can easily be toughened by a conventional tempering method. Besides, an infrared and ultraviolet absorbing glass sheet is desired to have a pleasing tint such as a greenish tint or a bluish tint.

U.S. Pat. No. 4,792,536 shows an infrared and ultraviolet absorbing glass and a method of producing the same. Basically the glass is a soda-lime-silica glass. In the glass, the content of total iron expressed as $Fe_2O_3$ is up to 1 wt %, and preferably 0.45-0.65 wt %, and at least 35% of the total iron is in the ferrous state as FeO. Besides, the glass contains up to 1.5 wt % of $CeO_2$ and/or $TiO_2$. An important feature of the glass of this patent is that the content of $SO_3$ is less than 0.02 wt %.

From an industrial point of view, the proposal of U.S. Pat. No. 4,792,536 is not favorable because the proposed glass cannot be produced by the conventional glass-melting operations. As is disclosed in the patent specification, due to the very low content of sulfur, it is necessary to employ a complicated two-stage melting and refining operations by using a special stirring means.

U.S. Pat. No. 5,077,133 shows a green-colored, infrared energy and ultraviolet radiation absorbing soda-lime-silica glass containing 0.51-0.96 wt % of $Fe_2O_3$, 0.15-0.33 wt % of FeO and 0.2-1.4 wt % of $CeO_2$. In this glass, the total amount of iron is from 0.7 wt % to about 1.25 wt %, expressed as $Fe_2O_3$, and the degree of reduction from ferric to ferrous iron is from 23% to 29%. The degree of reduction of this glass is relatively low, and it is necessary to add a relatively large amount of total iron to the glass batch composition. Furthermore, it is not easy to desirably toughen this glass by a conventional tempering method.

WO 91/11402 shows a green-colored, infrared and ultraviolet radiation absorbing soda-lime-silica glass containing 0.75-1.2 wt % of total iron expressed as $Fe_2O_3$, 0.2-1.4 wt % of $CeO_2$, and a small amount of carbon (from about 0.15 to about 0.7 pounds per 1,000 pounds of glass). This glass also has a relatively low degree of reduction from ferric to ferrous iron, ranging from about 22% to 29%, and it is necessary to add a relatively large amount of total iron and a small amount of carbon to the glass batch composition. Furthermore, it is not easy to desirably toughen this glass by a conventional tempering method.

SUMMARY OF THE INVENTION

It is an object of the present invention to provide an infrared and ultraviolet absorbing glass, which has a greenish tint, which is well balanced in visible light transmittance, infrared radiation absorption and ultraviolet radiation absorption, and which can be readily toughened by a conventional tempering method.

It is another object of the invention to provide a method for industrially easily producing an infrared and ultraviolet absorbing glass according to the invention.

The present invention provides a green-colored infrared and ultraviolet radiation absorbing glass comprising as essential components, on a weight basis, 68-72% of $SiO_2$, 1.6-3.0% of $Al_2O_3$, 8.5-11.0% of CaO, 2.0-4.2% of MgO, 12.0-16.0% of $Na_2O$, 0.5-3.0% of $K_2O$, 0.03-0.30% of $SO_3$, 0.58-0.80% of total iron as $Fe_2O_3$, 0.1-0.7% of $CeO_2$, 0.1-0.4% of $TiO_2$ and 5-350 ppm of MnO with provisos that the total of the above defined essential components amounts to at least 98 wt % of the glass, that the total of $SiO_2$, $Al_2O_3$ and $TiO_2$ is from 70-74%, that the total of CaO and MgO is from 12-15%, that the total of $Na_2O$ and $K_2O$ is from 13-17%, that said total iron includes ferrous iron and ferric iron and that the weight ratio of said ferrous iron to said ferric iron, $Fe^{2+}/Fe^{3+}$, is in the range from 0.50 to 0.70, and more preferably from 0.53 to 0.68.

In this invention, it is an important feature that in the glass the degree of reduction of iron, $Fe^{2+}/Fe^{3+}$, is relatively high. It is preferably to produce an infrared and ultraviolet absorbing glass according to the invention by using a frit glass which has a low melting point and contains ferrous oxide and ferric oxide with a high degree of reduction as a part of a batch of glass composition to be melted. More particularly, this frit glass contains carefully and strictly specified proportions of the fundamental components of soda-lime-silica glass and additionally incorporated relatively small and strictly specified amounts of iron oxide, manganese oxide, cerium oxide and titanium oxide. Furthermore, this frit glass contains relatively small and strictly specified amounts of sulfide ion and a sulfate such as sodium sulfate, thereby suppressing a decline of meltability of a batch of glass composition.

A glass according to the invention has a greenish tint and sufficiently low in both infrared and ultraviolet radiation transmittances but sufficiently high in visible light transmittance, and this glass is very good in weatherability. This glass is relatively high in Young's modulus, Poisson's ratio and thermal expansion coefficient and relatively low in heat conductivity. An infrared and ultraviolet absorbing glass sheet according to the invention can easily be toughened to a desired degree by a conventional tempering method.

A glass according to the invention can be formed into glass sheets of various thicknesses, for example, ranging from about 1 mm to about 10 mm, and according to the need the glass sheets can be bent and/or tempered. Besides, a glass according to the invention can be used as a component of laminated glass or insulated glass. A glass sheet according to the invention is very suitable for use in building and vehicle windows and particularly in automobile windows. Optionally a glass according to the invention can be used for various articles other than window glasses, such as furniture and cooking utensils for example.

DESCRIPTION OF THE PREFERRED EMBODIMENTS

Basically an infrared and ultraviolet absorbing glass according to the invention is a soda-lime-silica glass. The fundamental components of the glass are $SiO_2$, $Al_2O_3$, CaO, MgO, $Na_2O$ and $K_2O$, and the proportions of these components are strictly limited in order that the glass should be easily produced by a usual glass-making process and should posses desirable properties including good temperability.

The glass contains 68 to 72 wt % of $SiO_2$ together with 1.6 to 3.0 wt % of $Al_2O_3$. If $SiO_2$ is less than 68% or $Al_2O_3$ is less than 1.6%, the glass is not always good in weatherability and may exhibit weathering strain. If $SiO_2$ exceeds 72%, the glass composition becomes inferior in meltability, and the glass may not be good in temperability. If $Al_2O_3$ exceeds 3%, the glassmaking operations encounter difficulty because of the likelihood of devitrification and narrowing of the range of temperature for forming glass.

The total amount of $SiO_2$, $Al_2O_3$ and $TiO_2$ in the glass is limited within the range from 70 to 74 wt %. If the total amount is less than 70%, the glass is not always good in weatherability, and if it exceeds 74%, the glass may not be good in temperability.

The glass contains 8.5 to 11.0 wt % of CaO and 2.0 to 4.2 wt % of MgO. These components contribute to a reduction in the melting temperature of the glass composition. If CaO is less than 8.5% or MgO is less than 2.0%, the melting temperature is not sufficiently low, and the flow point of the glass is not desirably low particularly in the case of shortage of CaO. If CaO exceeds 11.0%, the glassmaking operations encounter difficulty because of the likelihood of devitrification. If MgO exceeds 4.2%, the glass may not be good in temperability. In the glass, the total amount of CaO and MgO is limited within the range from 12 to 15 wt %. If the total of these two components is less than 12%, the glass is not good in temperability, and if it exceeds 15%, restrictions are placed on the glassmaking operations because of a tendency to devitrification.

The glass contains 12.0 to 16.0 wt % of $Na_2O$ together with 0.5 to 3.0 wt % of $K_2O$. If $Na_2O$ is less than 12.0%, difficulty arises in the glassmaking operations because of a tendency to devitrification and a narrowed range of temperature for forming the glass, and the glass is not good in temperability. If $Na_2O$ exceeds 16.0%, the glass is not always good in weatherability and may exhibit weathering strain. If $K_2O$ is less than 0.5%, the glass may not be good in temperability, and if it exceeds 3.0%, the glass may not be good in weatherability. In the glass, the total amount of $Na_2O$ and $K_2O$ is limited within the range from 13 to 17 wt %. If the total of these two components is less than 13%, difficulty will arise in the glassmaking operations because of the likelihood of devitrification and narrowing of the range of operating temperature, and the glass is not good in temperability. If it exceeds 17%, the glass is not good in weatherability.

A glass according to the invention contains a limited amount of sulfur which is known to serve as a melting and refining aid. The glass contains 0.03 to 0.30 wt % of sulfur expressed as $SO_3$. If the content of $SO_3$ is less than 0.03%, it is difficult to accomplish uniform melting and defoaming of the glass by usual operations. If the content of $SO_3$ exceeds 0.30%, the glass tends to exhibit a yellowish or amber tint instead of a desired greenish tint. It is preferable that the $SO_3$ is relatively low and ranges from about 0.10 to about 0.15 wt %.

The essential components of a glass according to the invention include limited amounts of iron oxides (expressed as $Fe_2O_3$ for convenience), $CeO_2$ and $TiO_2$ and a trace of MnO. These additives are employed for desirably modifying the coloration and optical characteristics of the glass.

In the glass, the amount of total iron expressed as $Fe_2O_3$ is from 0.58 to 0.80 wt %. If total iron is less than 0.58%, it is difficult to sufficiently reduce the infrared and ultraviolet transmittance through the glass. If it exceeds 0.80%, the glass becomes too low in visible transmittance and takes on an undesirably dark tint. It is preferable to control the total iron content within the range from 0.60 to 0.75 wt %, more preferably from 0.62 to 0.73 wt %.

More particularly, the glass must contain both ferrous iron expressed as FeO and ferric iron expressed as $Fe_2O_3$. FeO efficiently absorbs infrared radiation and tends to impart a greenish or bluish tint to the glass. $Fe_2O_3$ is absorptive of ultraviolet rays and tends to impart a yellowish tint to the glass. In a batch of glass composition for producing the infrared and ultraviolet absorbing glass, a large portion of iron is in the ferric state, $Fe_2O_3$. The batch is melted under such conditions that an adequate portion of the ferric oxide is reduced to ferrous oxide FeO, while the rest remains as ferric oxide $Fe_2O_3$. The degree of reduction of iron is an important factor in the glassmaking operations. Herein, the "degree of reduction" refers to the weight ratio of ferrous iron to ferric iron, $Fe^{2+}/Fe^{3+}$, in the obtained glass. In the present invention, the degree of reduction of iron is controlled within the range from 0.50 to 0.70. A preferred range of the degree of reduction is from 0.53 to 0.68.

$CeO_2$ and $TiO_2$ are incorporated in the glass as ultraviolet absorbing agents. $CeO_2$ has high ability to absorb ultraviolet rays, and the presence of $CeO_2$ considerably affects the degree of reduction of iron. $TiO_2$ is low in the ability to absorb ultraviolet rays, but the degree of reduction of iron is not significantly affected by the presence of $TiO_2$. In this invention, specific and relatively small amounts of $CeO_2$ and $TiO_2$ are used in combination in order to afford the glass with desirably balanced optical characteristics without greatly varying the degree of reduction of iron in the conventional glass melting furnaces. In the glass, the amount of $CeO_2$ is from 0.1 to 0.7 wt %, and more preferably from 0.2 to 0.65 wt %. In the glass, the amount of $TiO_2$ is from 0.1 to 0.4 wt %.

According to the invention, a very small amount of MnO is incorporated in the glass. By the presence of Mn, the reduction of iron is slightly affected so that the degree of reduction of iron tends to slightly decrease, while the reduction of cerium is not significantly affected. Besides, MnO serves for minute adjustment of the coloration of the glass containing iron since MnO has an absorption at about 500 nm. The content of MnO is limited within the range from 5 to 350 ppm by weight, and more preferably from about 100 to 300 ppm. If a large amount of MnO is incorporated, the glass tends to exhibit undesirable optical characteristics such as, for example, solarization.

A very small amount of ZnO is optionally incorporated in the glass.

In producing the glass which has the aforementioned composition, it is preferred to use a cullet of a frit glass of the following composition as a part of a batch of glass composition to be melted. On a weight basis, the frit glass consists essentially of 45–65% of $SiO_2$, 3.5–10.0% of $Al_2O_3$, 13–30% of CaO, 4.0–5.5% of MgO, 6.5–12.0% total of $Na_2O$ and $K_2O$, 0.04–0.15% of $SO_3$, 0.05–0.50% of $S^{2-}$, 0.40–0.65% of total iron expressed as $Fe_2O_3$, 0.05–0.45% of MnO, 0.25–0.65% of $TiO_2$, 0.10–0.55% of $CeO_2$ with provisos that the total of the above defined essential components amounts to at least 95 wt % of the frit glass and that the total iron includes ferrous iron and ferric iron and that the weight ratio of the ferrous iron expressed as FeO to the total iron expressed as $Fe_2O_3$ is not less than 0.5.

In producing the glass by using cullet of the above described frit glass, it is suitable that the cullet of the frit glass amounts to 1–35 wt % of a batch of glass composition to be melted. The cullet of the frit glass preferably amounts to 5–30 wt %, and more preferably to 8–25 wt %. The use of such an amount of the frit glass is favorable for realization of the aimed degree of reduction of iron in the glass and the aimed green color of the glass and also for stable operation of the glass melting furnace and stable and uniform melting of the glass batch. It is optional to use the cullet of the above frit glass together with another cullet such as a return cullet.

The following nonlimitative examples are illustrative of the invention.

EXAMPLE 1

A frit glass (frit glass A) was produced by using industrial raw materials of glass. That is, silica sand, feldspar, soda ash, dolomite, limestone, red iron oxide (rouge), ilmenite, titanium oxide, cerium carbonate, zinc oxide and sodium sulfate were weighed and mixed aiming at a prescribed glass composition. As a reducing agent carbon powder was added to the mixed materials. The mixture was melted in an electric furnace, and the molten glass was homogenized and clarified by conventional operations.

The obtained frit glass A contained, on a weight basis, 63.6% $SiO_2$, 3.94% $Al_2O_3$, 15.07% CaO, 4.2% MgO, 11.7% total of $Na_2O$ and $K_2O$, 0.62% total iron expressed as $Fe_2O_3$, 0.30% $TiO_2$, 0.492% $CeO_2$, 0.12% MnO, 0.093% $SO_3$ and 0.117% $S^{2-}$.

Next, an infrared and ultraviolet absorbing glass sheet was produced by using 20 wt % of cullet of the frit glass A together with 10 wt % of a return cullet and 70 wt % of the above-mentioned raw materials except carbon powder. The glass composition was formulated such that the viscosity-temperature becomes about 650°–685° C. at $10^9$ poise and about 555°–585° C. at $10^{12}$ poise and such that the difference between the two temperatures becomes about 90°–105° C. In a crucible the mixture of the raw materials, cullet of the frit glass A and the return cullet was melted by heating in an electric furnace. In the melting operation sodium sulfate amounting about 0.5 wt % of total silica was used. After the usual homogenizing and clarifying operations the molten glass was formed into a glass sheet. After annealing the glass sheet was cut into about 50 mm square pieces, and each piece was ground to a thickness of about 5 mm.

By chemical analysis, the obtained glass contained, on a weight basis, 70.1% $SiO_2$, 1.87% $Al_2O_3$, 9.07% CaO, 3.6% MgO, 13.4% $Na_2O$, 0.67% $K_2O$, 0.63% total iron expressed as $Fe_2O_3$, 0.19% $TiO_2$, 0.31% $CeO_2$, 0.13% $SO_3$, about 280 ppm MnO. The total of these components amounted to 100.0%. The total of $SiO_2$, $Al_2O_3$ and $TiO_2$ was 72.16%; the total of CaO and MgO was 12.67%; and the total of $Na_2O$ and $K_2O$ was 14.07%. The degree of reduction of iron, $Fe^{2+}/Fe^{3+}$, was about 0.57.

The obtained glass had a green color. The optical characteristics of this glass were measured by the methods according to JIS Z 8722, JIS R 3106 and ISO/DIS 9050 by using an automated spectrophotometer. At a thickness of 5 mm, the glass exhibited visible light (standard illuminant A) transmittance of about 71.0 to about 71.4%, total solar radiation transmittance of about 42.0 to about 42.4 and ultraviolet transmittance of about 12 to about 13%. The transmittance for solar radiation in an infrared region (around 1100 nm) was about 13.0 to about 13.5%. The dominant wavelength was about 507 to about 508 nm, and the excitation purity was about 3.0.

It was confirmed that the viscosity-temperatures of this glass were as aimed. To test temperability, some of the glass sheets (3.8 mm in thickness) were tempered by heating in a furnace at about 700° C. for about 5 min and immediately blowing cooling air against the heated glass sheet. The tempered glass sheets were fractured by an impact at a point in a corner region to examine the manner of fragmentation in respect of the number of fragments and the sizes of the respective fragments. The manner of fragmentation satisfied the requirements of JIS R 3211 for tempered glasses for automobile side and rear windows.

EXAMPLE 2

A frit glass (frit glass B) was prepared by uniformly mixing cullet of a $SiO_2$—$Al_2O_3$—CaO glass containing $Fe_2O_3$, $TiO_2$, MnO, $SO_3$, $S^{2-}$ and the like with cullet of a $SiO_2$—$Al_2O_3$—CaO—$R_2O$ (R represents sodium and potassium) glass containing $Fe_2O_3$, $TiO_2$, $CeO_2$, $SO_3$ and the like.

The obtained frit glass B contained, on a weight basis, 59.4% $SiO_2$, 5.24% $Al_2O_3$, 19.11% CaO, 4.5% MgO, 10.2% total $Na_2O$ and $K_2O$, 0.57% total iron expressed as $Fe_2O_3$, 0.37% $TiO_2$, 0.42% $CeO_2$, 0.18% MnO, 0.09% $SO_3$, 0.2% $S^{2-}$. The degree of reduction was as aimed.

Next, as is described in Example 1, an infrared and ultraviolet absorbing glass sheet was produced by using 10 wt % of cullet of the frit glass B together with 30 wt % of a return cullet and 60 wt % of the above-mentioned raw materials of Example 1.

The obtained glass contained, on a weight basis, 69.9% $SiO_2$, 1.84% $Al_2O_3$, 9.09% CaO, 3.64% MgO, 13.45% $Na_2O$, 0.59% $K_2O$, 0.69% total iron expressed as $Fe_2O_3$, 0.24% $TiO_2$, 0.40% $CeO_2$, 0.1% $SO_3$ and about 260 ppm MnO. The total of these components amounted to 99.97%. The total of $SiO_2$, $Al_2O_3$ and $TiO_2$ was 71.98%; the total of CaO and MgO was 12.73%; and the total of $Na_2O$ and $K_2O$ was 14.04%. The degree of reduction of iron, $Fe^{2+}/Fe^{3+}$, was about 0.55.

The obtained glass had a green color. At a thickness of 5 mm, the glass exhibited visible light (standard illuminant A) transmittance of about 68.5%, total solar radiation transmittance of about 38.0 to about 38.5 and ultraviolet transmittance of about 10 to about 11%. The transmittance for solar radiation in an infrared region (around 1100 nm) was about 9.0 to about 9.5%. The dominant wavelength was about 507 nm, and the excitation purity was about 3.5.

In the temperability test, the result satisfied the requirements of JIS R 3211.

EXAMPLE 3

A frit glass (frit glass C) was prepared by uniformly mixing cullet of a $SiO_2$—$Al_2O_3$—CaO glass containing $Fe_2O_3$, $TiO_2$, MnO, $SO_3$, $S^{2-}$ and the like with cullet of a $SiO_2$—$Al_2O_3$—CaO—$R_2O$ (R represents sodium and potassium) glass containing $Fe_2O_3$, $TiO_2$, $CeO_2$, $SO_3$ and the like.

The obtained frit glass C contained, on a weight basis, 52.3% $SiO_2$, 7.67% $Al_2O_3$, 25.85% CaO, 5.1% MgO, 7.44% total $Na_2O$ and $K_2O$, 0.48% total iron expressed as $Fe_2O_3$, 0.49% $TiO_2$, 0.3% $CeO_2$, 0.28% MnO, 0.08% $SO_3$, 0.33% $S^{2-}$. The degree of reduction was as aimed.

Next, as is described in Example 1, an infrared and ultraviolet absorbing glass sheet was produced by using 10 wt % of cullet of the frit glass C together with 25 wt % of a return cullet and 65 wt % of the above-mentioned raw materials of Example 1.

The obtained glass contained, on a weight basis, 69.7% $SiO_2$, 1.9% $Al_2O_3$, 9.1% CaO, 3.6% MgO, 13.5% $Na_2O$, 0.6% $K_2O$, 0.71% total iron expressed as $Fe_2O_3$, 0.24% $TiO_2$, 0.60% $CeO_2$, 0.12% $SO_3$ and about 350 ppm MnO. The total of these components amounted to 100.0%. The total of $SiO_2$, $Al_2O_3$ and $TiO_2$ was 71.84%; the total of CaO and MgO was 12.7%; and the total of $Na_2O$ and $K_2O$ was 14.1%. The degree of reduction of iron, $Fe^{2+}/Fe^{3+}$, was about 0.55.

The obtained glass had a green color. At a thickness of 5 mm, the glass exhibited visible light (standard illuminant A) transmittance of about 68.6%, total solar radiation transmittance of about 37.5 to about 38.0% and ultraviolet transmittance of about 8 to about 9%. The transmittance for solar radiation in an infrared region (around 1100 nm) was about 8.5 to about 9.0%. The dominant wavelength was about 508 to about 509 nm, and the excitation purity was about 3.0.

In the temperability test, the result satisfied the requirements of JIS R 3211.

EXAMPLE 4

Similar to Example 1, a frit glass (frit glass D) was produced by using industrial raw materials of glass. The mixture of the raw materials was melted in an electric furnace, and the molten glass was homogenized and clarified by conventional operations.

The obtained frit glass D contained, on a weight basis, 47.0% $SiO_2$, 9.42% $Al_2O_3$, 30.0% CaO, 5.5% MgO, 6.5% total of $Na_2O$ and $K_2O$, 0.41% total iron expressed as $Fe_2O_3$, 0.57% $TiO_2$, 0.21% $CeO_2$, 0.352% MnO, 0.072% $SO_3$ and 0.42% $S^{2-}$. The degree of reduction of iron was as aimed.

Next, an infrared and ultraviolet absorbing glass sheet was produced by using 5 wt % of cullet of the frit glass D together with 40 wt % of a return cullet and 55 wt % of the raw materials.

The obtained glass contained, on a weight basis, 70.0% $SiO_2$, 1.8% $Al_2O_3$, 9.1% CaO, 3.5% MgO, 13.5% $Na_2O$, 0.6% $K_2O$, 0.66% total iron expressed as $Fe_2O_3$, 0.22% $TiO_2$, 0.46% $CeO_2$, 0.13% $SO_3$ and about 300 ppm MnO. The total of these components amounted to 99.99%. The total of $SiO_2$, $Al_2O_3$ and $TiO_2$ was 72.02%; the total of CaO and MgO was 12.6%; and the total of $Na_2O$ and $K_2O$ was 14.1%. The degree of reduction of iron, $Fe^{2+}/Fe^{3+}$, was about 0.53.

The obtained glass had a green color. At a thickness of 5 mm, the glass exhibited visible light (standard illuminant A) transmittance of about 70.0%, total solar radiation transmittance of about 39 to about 40% and ultraviolet transmittance of about 9 to about 10%. The transmittance for solar radiation in an infrared region (around 1100 nm) was about 9.0 to about 10.0%. The dominant wavelength was about 508 to about 510 nm, and the excitation purity was about 3.5.

In the temperability test, the result satisfied the requirements of JIS R 3211.

What is claimed is:

1. A green-colored infrared and ultraviolet radiation absorbing glass consisting essentially of as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.03–0.30% of $SO_3$, 0.58–0.80% of total iron expressed as $Fe_2O_3$, 0.1–0.7% of $CeO_2$, 0.1–0.4% of $TiO_2$ and 5–350 ppm of MnO with provisos that the total of the above defined essential components amounts to at least 98 wt % of the glass, that the total of $SiO_2$, $Al_2O_3$ and $TiO_2$ is from 70–74%, that the total of CaO and MgO is from 12–15%, that the total of $Na_2O$ and $K_2O$ is from 13–17%, that said total iron includes ferrous iron and ferric iron and that the weight ratio of said ferrous iron to said ferric iron, $Fe^{2+}/Fe^{3+}$, is in the range from 0.50 to 0.70.

2. A glass according to claim 1, wherein the amount of said total iron expressed as $Fe_2O_3$ is in the range from 0.60 to 0.75 wt %.

3. A glass according to claim 2, wherein the amount of said total iron expressed as $Fe_2O_3$ is in the range from 0.62 to 0.73 wt %.

4. A glass according to claim 1, wherein the amount of $SO_3$ is in the range from 0.05 to 0.30 wt %.

5. A glass according to claim 4, wherein the amount of $SO_3$ is in the range from 0.10 to 0.15 wt %.

6. A glass according to claim 1, wherein the weight ratio of said ferrous iron to said ferric iron, $Fe^{2+}/Fe^{3+}$, is in the range from 0.53 to 0.68.

7. A glass according to claim 1, wherein the amount of $CeO_2$ is in the range from 0.20 to 0.65 wt %.

8. A glass according to claim 1, wherein the amount of $TiO_2$ is in the range from 0.10 to 0.35 wt %.

9. A glass according to claim 1, wherein the amount of MnO is in the range from 100 to 300 ppm by weight.

10. A method of producing a green-colored infrared and ultraviolet radiation absorbing glass comprising melting a batch of glass composition consisting essentially of as essential components, on a weight basis, 68–72% of $SiO_2$, 1.6–3.0% of $Al_2O_3$, 8.5–11.0% of CaO, 2.0–4.2% of MgO, 12.0–16.0% of $Na_2O$, 0.5–3.0% of $K_2O$, 0.03–0.30% of $SO_3$, 0.58–0.80% of total iron expressed as $Fe_2O_3$, 0.1–0.7% of $CeO_2$, 0.1–0.4% of $TiO_2$, and 5–350 ppm of MnO with provisos that the total of the above defined essential components amounts to at least 98 wt % of the glass, that the total of $SiO_2$, $Al_2O_3$ and TiO$_2$ is from 70–74%, that the total of CaO and MgO is from 12–15%, that the total of Na$_2$O and K$_2$O is from 13–17%, that said total iron includes ferrous iron and ferric iron and that the weight ratio of said ferrous iron to said ferric iron, Fe$_{2+}$/Fe$_{3+}$, is in the range of 0.50 to 0.70, characterized in that a part of a batch of glass composition to be melted is cullet of a frit glass which consists essentially of as essential components, on a weight basis 45–65% of SiO$_2$, 3.5–10.0% of Al$_2$O$_3$, 13–30% of CaO, 4.0–5.5% of MgO, 6.5–12.0% total of Na$_2$O and K$_2$O, 0.04–0.15% of SO$_3$, 0.05–0.50% of S$^{2-}$, 0.40–0.65% of total iron expressed as Fe$_2$O$_3$, 0.05–0.45% of MnO, 0.25–0.65% of TiO$_2$, 0.10–0.55% of CeO$_2$ with provisos that the total of the above defined essential components of said frit glass amounts to at least 95 wt % of the frit glass and that the total iron includes ferrous iron and ferric iron and that the weight ratio of the ferrous iron expressed as FeO to the total iron expressed as Fe$_2$O$_3$ is not less than 0.5, wherein the amount of said cullet of said frit glass is from 1 to 35 wt % of said batch of glass composition.

11. A method according to claim 10, wherein the amount of said cullet of said frit glass is from 5 to 30 wt % of said batch of glass composition.

12. A method according to claim 11, wherein the amount of said cullet of said frit glass is from 8 to 25 wt % of said batch of glass composition.

13. A method according to claim 12, wherein said batch of glass composition is melted in the presence of sodium sulfate, the amount of said sodium sulfate being not more than 0.5 wt % of total silica in said batch of glass composition.

* * * * *